US011070131B2

(12) United States Patent
Liang et al.

(10) Patent No.: US 11,070,131 B2
(45) Date of Patent: Jul. 20, 2021

(54) METHODS, APPARATUS AND CIRCUITS TO CONTROL TIMING FOR HYSTERETIC CURRENT-MODE BOOST CONVERTERS

(71) Applicant: Texas Instruments Incorporated, Dallas, TX (US)

(72) Inventors: Jian Liang, Shanghai (CN); Weiwei Xiong, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 220 days.

(21) Appl. No.: 16/006,341

(22) Filed: Jun. 12, 2018

(65) Prior Publication Data

US 2019/0229619 A1    Jul. 25, 2019

Related U.S. Application Data

(60) Provisional application No. 62/621,148, filed on Jan. 24, 2018.

(51) Int. Cl.
*H02M 3/158* (2006.01)
*H02M 3/157* (2006.01)
*H02M 1/00* (2006.01)

(52) U.S. Cl.
CPC .......... *H02M 3/158* (2013.01); *H02M 3/157* (2013.01); *H02M 2001/0022* (2013.01)

(58) Field of Classification Search
CPC ................. H02M 3/158; H02M 3/157; H02M 2001/0022
See application file for complete search history.

(56) References Cited

U.S. PATENT DOCUMENTS 5,321,348 A    6/1994  Vinciarelli et al.
6,943,504 B1 *  9/2005  York .................. H05B 33/0815
                                            315/224
(Continued)

FOREIGN PATENT DOCUMENTS

JP    5474453 B2    4/2014
RU    2292627 C1    6/2005

OTHER PUBLICATIONS

Search Report for PCT Application No. PCT/US19/14538, dated May 16, 2019, 1 page.
RU2292627C1, Machine Translation, 14 pages.
JP5474453B2, Machine Translation, 15 pages.
Tsai et al., "Modified Hysteretic Current Control (MHCC) for Improving Transient Response of Boost Converter," IEEE Transactions on Circuits and Systems-I: Regular Papers, vol. 58, No. 8, Aug. 2011, pp. 1967-1979.

(Continued)

*Primary Examiner* — Thienvu V Tran
*Assistant Examiner* — Bart Iliya
(74) *Attorney, Agent, or Firm* — Mark Allen Valetti; Charles A. Brill; Frank D. Cimino (57) ABSTRACT

Examples to control timing for current-mode boost converters are disclosed. An example device to control timing includes a first input terminal to receive an input voltage of a current-mode boost converter a second input terminal to receive an output voltage of the current-mode boost converter, a generator to generate a first timing signal from the input voltage and the output voltage, a third input terminal to receive a second timing signal from the current-mode boost converter, a selector to select between the first on_off time signal and the second on_off time signal to generate a third on_off time signal based on a comparison of a first off time duration of the first on_off time signal and a second off time duration of the second on_off time signal, and an output terminal to control off times of the current-mode boost converter based on the third on_off time signal.

11 Claims, 9 Drawing Sheets

(56) References Cited

U.S. PATENT DOCUMENTS

| | | | | |
|---|---|---|---|---|
| 7,671,573 | B1* | 3/2010 | Ling | H02M 3/156 323/283 |
| 8,525,367 | B2 | 9/2013 | Sievers et al. | |
| 2002/0190698 | A1* | 12/2002 | Smidt | H02M 3/33584 323/222 |
| 2011/0037446 | A1* | 2/2011 | Engelhardt | H02M 3/1582 323/282 |
| 2012/0229108 | A1* | 9/2012 | Sprentall | H02M 3/156 323/282 |
| 2012/0299553 | A1* | 11/2012 | Menegoli | H02J 7/0052 320/140 |
| 2013/0257403 | A1* | 10/2013 | Yen | H02M 3/156 323/283 |
| 2014/0002046 | A1* | 1/2014 | Martin | H02M 3/156 323/282 |
| 2014/0084885 | A1* | 3/2014 | Ouyang | H02M 3/158 323/271 |
| 2016/0329734 | A1* | 11/2016 | Lee | H02M 3/156 |
| 2017/0126129 | A1* | 5/2017 | Li | H02M 1/08 |
| 2017/0288543 | A1* | 10/2017 | Jing | H02M 1/08 |

OTHER PUBLICATIONS

Neeraj Keskar et al., "Self-stabilizing, Hysteretic Boost DC-DC Converter for Portable Applications," Georgia Tech Analog Consortum Review, Georgia Institute of Technology, Apr. 2004, 10 pages.

Timothy Hegarty, "Current-Mode Control Stability Analysis for DC-DC Converters (Part 1)," How2Power Today Your Power Design Newsletter, Jun. 2014, 7 pages.

N. Keskar et al., "Self-Stabilizing, Integrated, Hysteretic Boost DC-DC Converter," Industrial Electronics Society, 2004. IECON 2004. 6 pages.

Texas Instruments Incorporated, "AN-1498 Current Mode Hysteretic Buck Regulators," Application Report, SNVA170B—May 2006—Revised May 2013, 11 pages.

Robert Sheehan, "Understanding and Applying Current-Mode Control Theory," Power Electronics Technology Exhibition and Conference, www.ti.com, Oct. 31, 2007, 30 pages.

Texas Instruments Incorporated, "TPS61322xx 6.5-µA Quiescent Current, 1.8-A Switch Current Boost Converter," www.ti.com, SLVSDY5B—Jan. 2018—Revised Apr. 2018, 37 pages.

* cited by examiner

METHODS, APPARATUS AND CIRCUITS TO
CONTROL TIMING FOR HYSTERETIC
CURRENT-MODE BOOST CONVERTERS

RELATED APPLICATION

This patent claims priority to and the benefit of U.S. Provisional Patent Application Ser. No. 62/621,148, which was filed on Jan. 24, 2018. U.S. Provisional Patent Application Ser. No. 62/621,148 is hereby incorporated herein by reference in its entirety.

FIELD OF THE DISCLOSURE

This disclosure relates generally to hysteretic current-mode boost controllers, and, more particularly, to methods, apparatus and circuits to control timing for hysteretic current-mode boost converters.

BACKGROUND

Some conventional high efficiency boost converters use a hysteretic current control mode.

As useful, the same reference numbers are used in the drawing(s) and accompanying written description to refer to the same or like parts. The figures are not drawn to scale. Connecting lines and/or connectors shown in the various figures are intended to represent example functional relationships and/or physical or logical couplings between the various elements. In the context of circuits and/or interconnection of circuits, such couplings are associated with corresponding electrical and/or optical conductors, wires, traces, terminals, inputs, outputs, printed circuit board (PCB) pads, etc. For example, a line shown in a figure between two components in a circuit includes a first input and/or output of a first component, a second input and/or output of a second component, and one or more interconnecting conductive members.

DETAILED DESCRIPTION

Reference will now be made in detail to non-limiting aspects of this disclosure, some of which are illustrated in the accompanying drawings.

Figure 1:
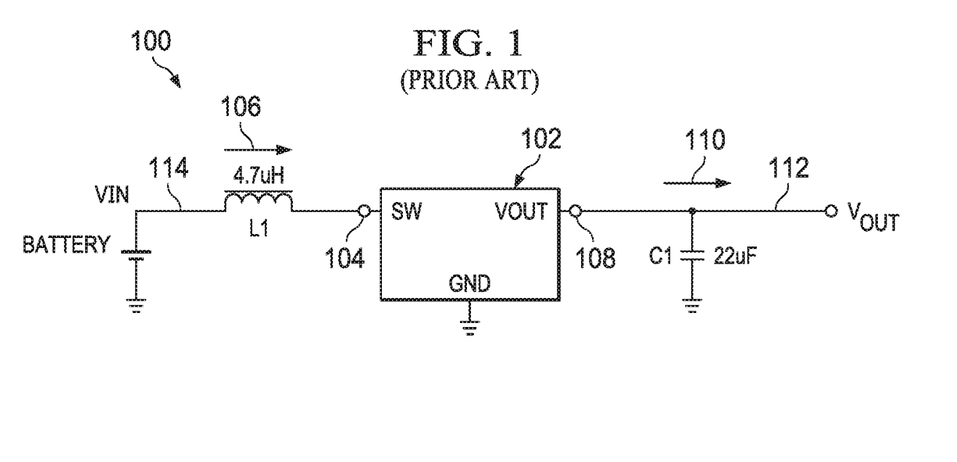
FIG. 1 is an example prior-art system that includes a hysteretic current-mode boost converter.

FIG. 1 illustrates an example system 100 that includes an example hysteretic current-mode boost converter 102. The current-mode boost converter 102 of FIG. 1 has an input terminal 104 for receiving an input current 106, and an output terminal 108 for delivering an output current 110, which is based on the input current 106. The current-mode boost converter 102 implements a hysteretic current-mode to sense the inductor current 106. In general, the current-mode boost converter 102 uses the output current 110 to regulate the inductor current 106, thereby maintaining a stable inductor current ripple, as well as a stable output voltage VOUT 112.

Figure 2:
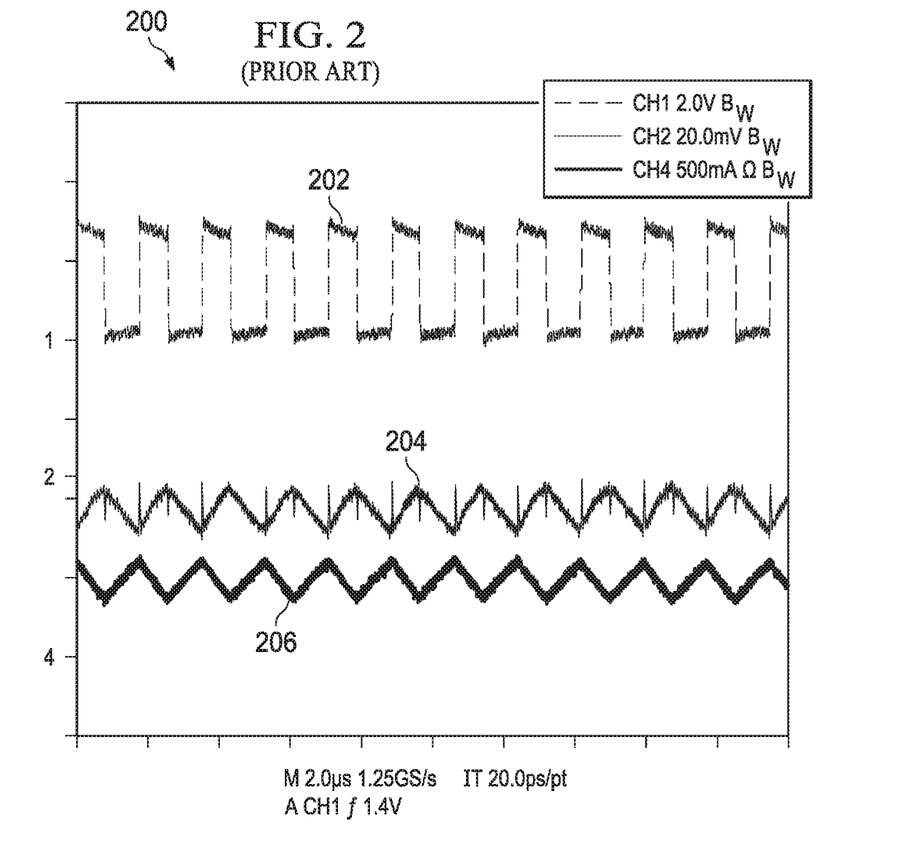
FIG. 2 is a graph of example waveforms for the system of FIG. 1.

The example graph 200 of FIG. 2 depicts an example waveform 202 of an example input voltage VIN 114 associated with the input current 106, an example waveform 204 of the output voltage VOUT 112, and an example waveform 206 of the example inductor current 106. As shown in FIG. 2, the waveform 202, the waveform 204 and the waveform 206 are stable (e.g., having a waveform with a generally consistent amplitude, frequency, duty cycle, mean, etc.).

Figure 3:
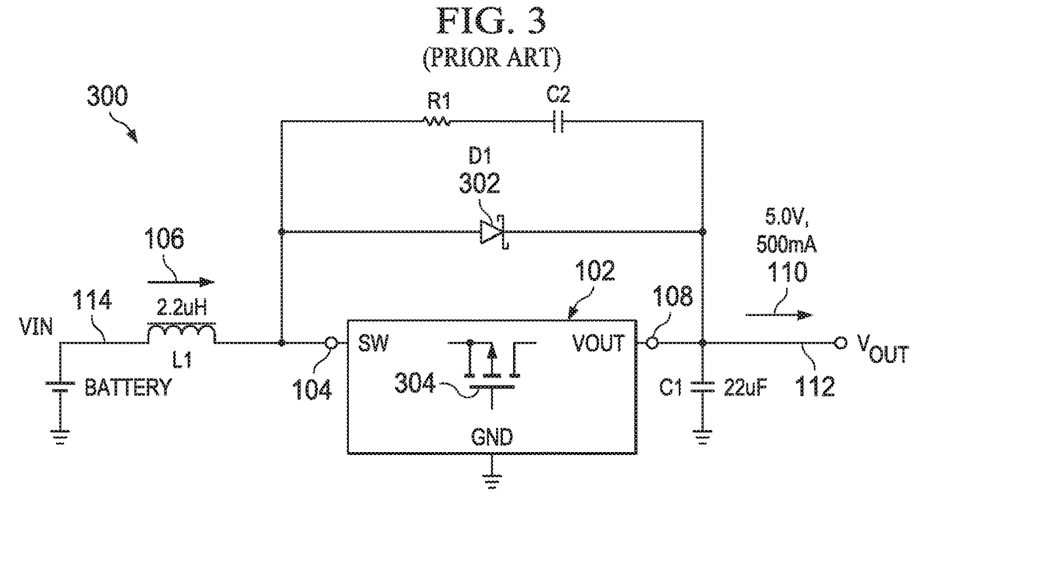
FIG. 3 is an example prior-art system that includes a hysteric current-mode boost converter and an external diode.

Turning to FIG. 3, another example system 300 that includes the hysteretic current-mode boost converter 102 of FIG. 1 is shown. In some current-mode boost converter systems, such as that shown in FIG. 3, an optional external Schottky diode D1 302 is added in parallel with a rectifier field effect transistor (FET) 304 of the current-mode boost converter 102 to increase output current capability for, for example, high output current applications.

Figure 4:
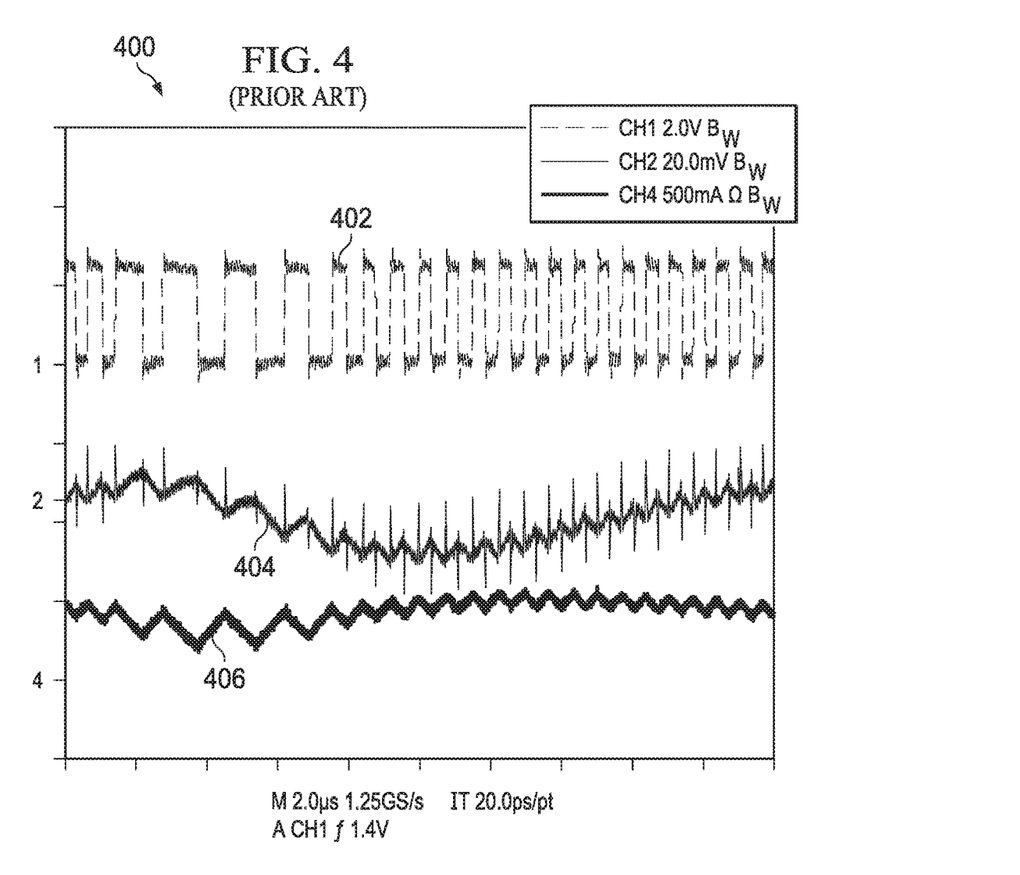
FIG. 4 is an example graph of example waveforms for the example system of FIG. 3.

However, as shown in an example graph 400 of FIG. 4, the addition of the Schottky diode D1 302 may cause instability of the current-mode boost converter 102. The example graph 400 of FIG. 4 depicts an example waveform 402 of the input voltage VIN 114, an example waveform 404 of the output voltage VOUT 112, and an example waveform 406 of the inductor current 106. As shown in FIG. 4, the waveform 402, the waveform 404 and the waveform 406 are oscillating in an unstable and undesirable fashion, as compared to the more stable configuration of FIG. 1. For example, the input voltage VIN 114 has a variable frequency, the mean of the output voltage VOUT 112 varies, etc.

As shown by way of FIGS. 1-4, these types of hysteretic current-mode converters 102 may not work as intended when external Schottky diodes 302 are used to boost output current capability of a converter 102. When an external Schottky diode 302 is included, some or all the inductor current 106 goes through the external Schottky diode 302 instead of going through the current-mode boost converter 102. Accordingly, inductor current 106 cannot be sensed accurately by the current-mode boost converter 102, which may cause the current-mode boost converter 102 to become unstable or operated in an undesirable fashion.

Figure 6:
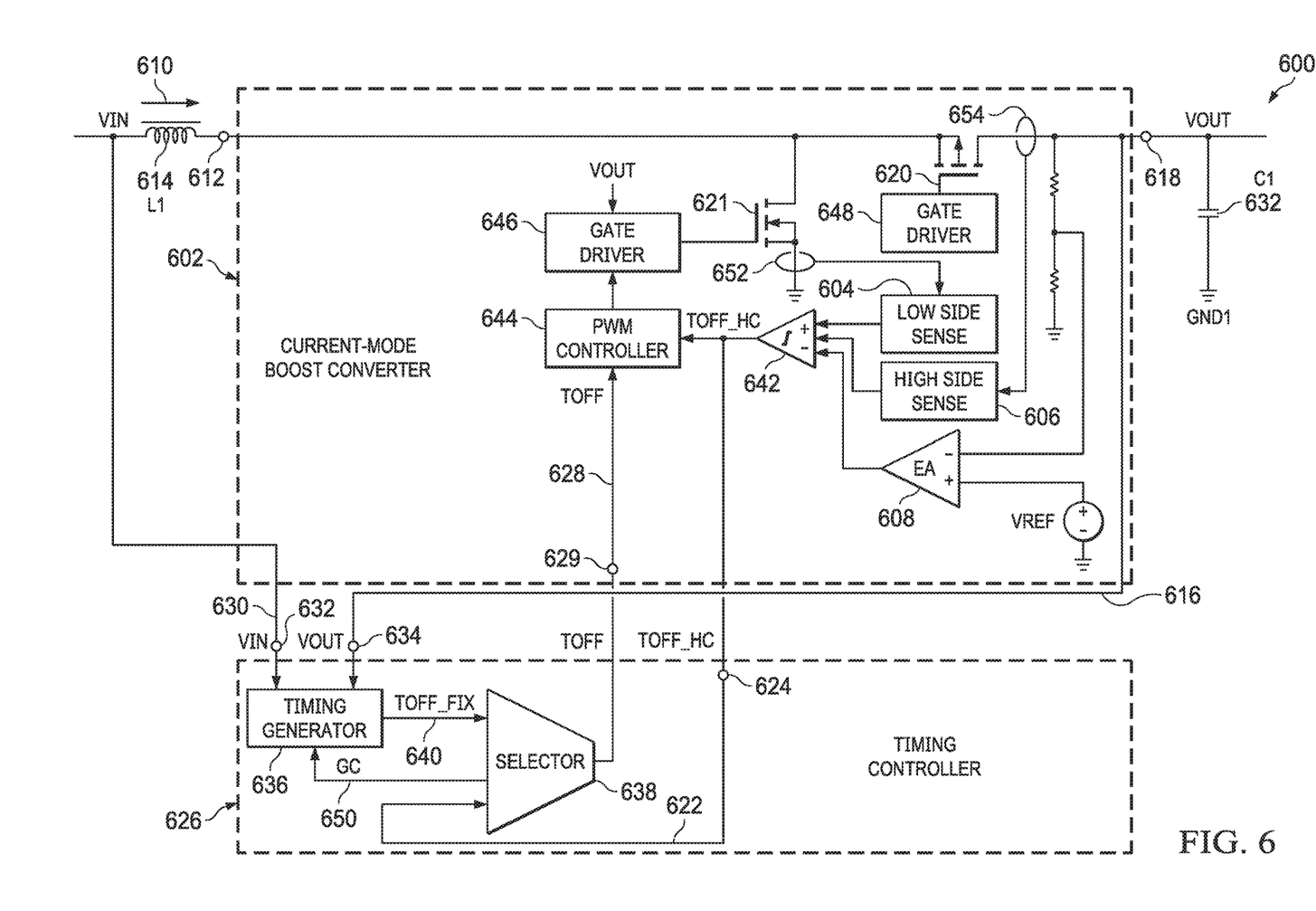
FIG. 6 is an example circuit that may be used to implement the converter of FIG. 5.

The present disclosure provides one or more solutions to address at least the problems discussed above. For instance, the present disclosure introduces one or more hysteretic current-mode converters that operate with stability with or without external Schottky diodes. In external Schottky diode applications, disclosed example hysteretic current-mode converters control timing of the converter (e.g., off times, on times, etc.). Off times are time periods during which the low side driver (LSD) FET (e.g., an example LSD FET 612 as shown in FIG. 6) is turned off, and the high side driver (HSD) FET (e.g., an example HSD FET 613 as shown in FIG. 6) is turned on. By contrast, on times are time periods during which the LSD FET is turned on, and the HSD FET is turned off. The disclosed hysteretic current-mode converters control the off times to be substantially constant (e.g., within an intended variability of each other, etc.).

While references are made herein to generating off time signals TOFF, TOFF_HC and TOFF_FIX in connection with controlling timing of a current-mode boost converter to ensure stability of the current-mode boost converter, such off time signals control both off times and on times. When timing is not signaling an off time, it is signaling an on time. Thus, the examples disclosed herein control both on time and off times of current-mode boost converters and can be signified, more generally, as timing signals.

Figure 5:
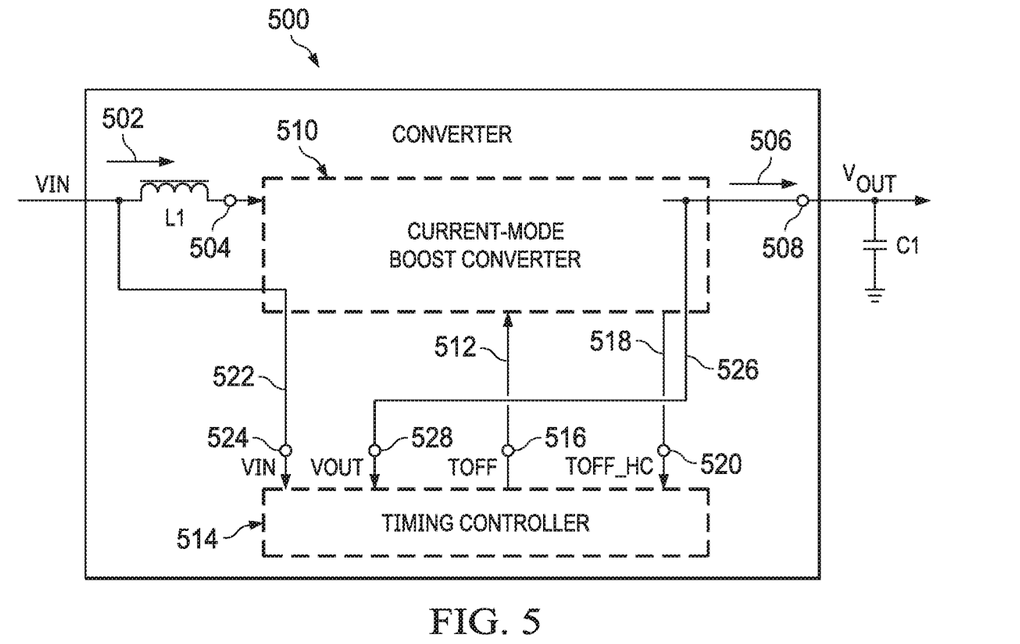
FIG. 5 illustrates an example converter in accordance with aspects of this disclosure.

FIG. 5 illustrates an example converter 500 according to an aspect of the present disclosure. To boost or increase a first (e.g., input) current 502 at a first (e.g., input) terminal 504 to generate a second (e.g., output) current 506 at a second (e.g., output) terminal 508, the converter 500 includes an example current-mode boost converter 510. The current-mode boost converter 510 may be implemented using the example current-mode boost converter circuit 602 as shown in FIG. 6.

To generate an off time TOFF 512, the converter 500 includes an example timing controller 514 according to an aspect of this disclosure. The timing controller 514 generates a constant (e.g., generally, substantially, sufficiently, etc.) off time TOFF 512 at a third (e.g., output) terminal 516 for a given off time TOFF_HC 518 at a fourth (e.g., input) terminal 520, a given input voltage VIN 522 on a fifth (e.g., input) terminal 524, and output voltage VOUT 526 on a sixth (e.g., input) terminal 528.

While an example manner of implementing the converter 500 is illustrated in FIG. 5, one or more of the elements, processes and/or devices illustrated in FIG. 5 may be combined, divided, re-arranged, omitted, eliminated and/or implemented in any other way. Further, the converter 500 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 6 is an example converter 600 that may be used to implement the converter 500 of FIG. 5. To implement the current-mode boost converter 510, the converter 600 includes an example current-mode boost converter 602. The current-mode boost converter 602 includes an example high side sensor 604 and an example low side sensor 606 to sense inductor current passing through an external diode (not shown), when present. An amplifier EA 608 regulates the inductor current of an external diode, if any, to maintain the stability of the ripple of an inductor current 610 at a seventh (e.g., input) terminal 612 of the current-mode boost converter 602 passing through an inductor L1 614, and the stability of an output voltage VOUT 616 at an eighth (e.g., output) terminal 618 of the current-mode boost converter 602. Usually both an LSD transistor 620 and an HSD transistor 621 are sensed to duplicate the inductor current passing through an external diode, if any. The current-mode boost converter 602 may be implemented using a current-mode boost converter modified to provide its hysteretic current based off time TOFF_HC 622 to a ninth (e.g., input) terminal 624 of a timing controller 626, and to receive its off time TOFF 628 at a tenth (e.g., input) terminal 629 of the current-mode boost converter 602 from the on/off time controller 626. During on times, the current 610 passing through the inductor L1 614 will ramp up; during off times, the inductor current 610 will ramp down. The inductor current 610 charges the output voltage VOUT 616 to maintain a stable output voltage VOUT 616 across a capacitor C1 632. A constant/stable off time is necessary for a stable output voltage VOUT 616.

To implement the timing controller 514 of FIG. 5, the converter 600 includes the timing controller 626. To generate a constant off time TOFF 628 at the tenth terminal 629 for a given input voltage VIN 630 at an eleventh (e.g., input) terminal 632 and a given output voltage VOUT 616 at a twelfth (e.g., input) terminal 634, the timing controller 626 includes an example timing generator 636. An example selector 638 is an off time selector. As discussed below in connection with FIG. 9, the selector 638 may be implemented by a circuit 900 that selects as the off time TOFF 628 the larger of an off time TOFF_FIX 640 generated by timing generator 636 and off time TOFF_HC 622 generated by a hysteretic current comparator 642 of the current-mode boost converter 602. A PWM controller 644 and gate drivers 646 and 648 control the gate of the LSD driver 620 and the gate of the HSD driver 621, respectively, based on the off time TOFF 628. For applications having an external Schottky diode, TOFF_HC 624 generated by the current-mode boost converter circuit 602 is short, and the selector 638 chooses the off time TOFF_FIX 640 generated by the timing generator 636. Thus, the converter 600 seamlessly operates in peak current control with reasonable and constant off time, regardless of whether an external Schottky diode is present. As will be described below in connection with FIGS. 7-9, the selector 638 provides a gate control (GC) signal 650 to control charging in the off time generator 636.

While an example manner of implementing the converter 500 of FIG. 5 is illustrated in FIG. 6, one or more of the circuits, elements, processes and/or devices of FIG. 6, and/or, more generally the converter 600 may be combined, divided, re-arranged, omitted, eliminated and/or implemented in any other way. Further, the converter 600 may include one or more circuits, elements, processes and/or devices in addition to, or instead of, those illustrated in FIG. 6, and/or may include more than one of any or all of the illustrated elements, processes and devices.

Figure 7:
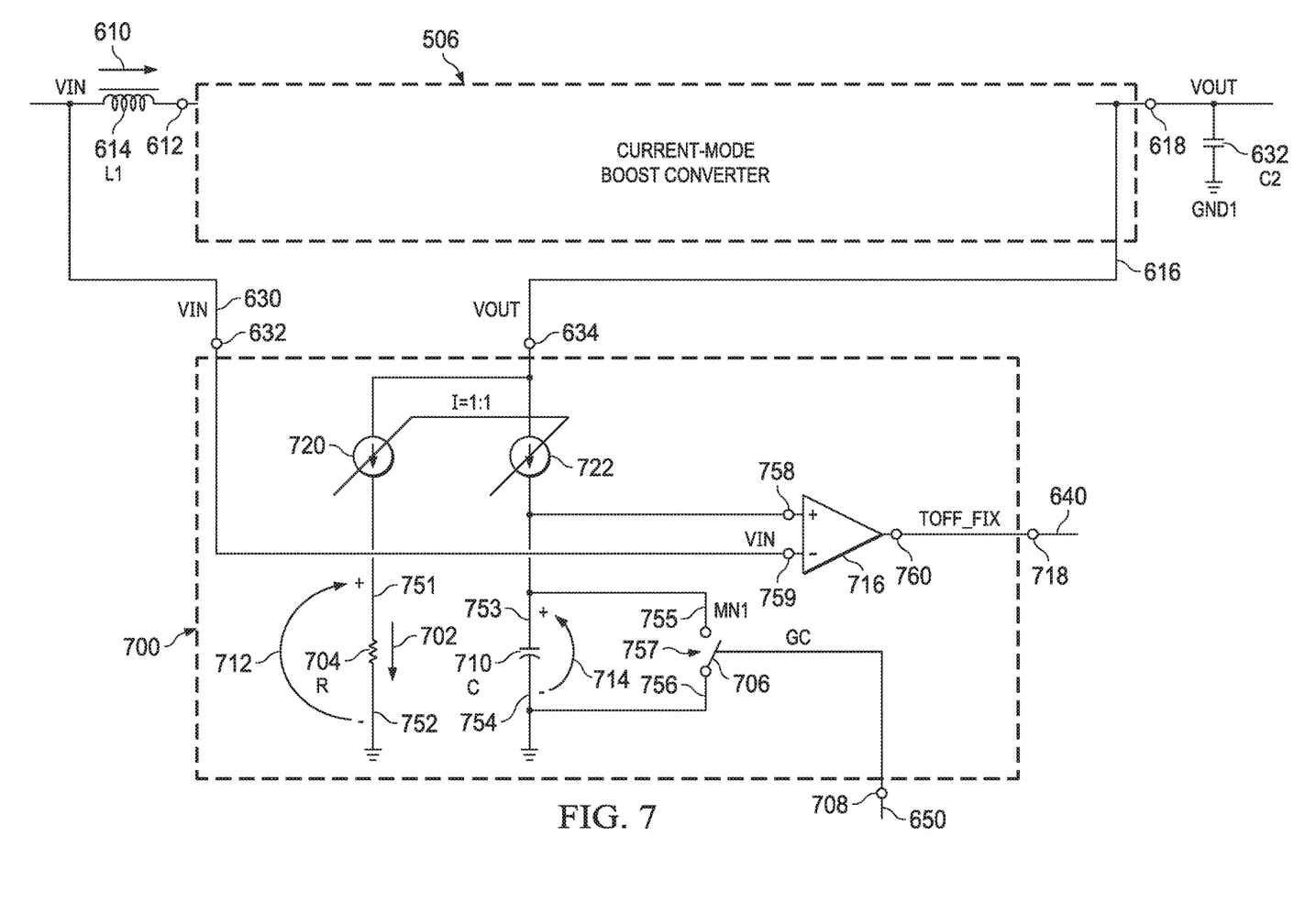
FIG. 7 is an example circuit that may be used to implement the timing generator of FIG. 6.

FIG. 7 is an example circuit 700 that may be used to implement the timing generator 636. In FIG. 7, the current 702 passing through a resistor R 704 depends on the output voltage VOUT 616 at the twelfth terminal 634, and a transistor MN1 706 is controlled by the GC signal 650. When the GC signal 650 at a fourteenth (e.g., input) terminal 708 turns the transistor MN1 706 on (e.g., the GC signal 650 is a logic zero), a capacitor C 710 is charged by a voltage 712 generated by the current 702 passing through the resistor R 704 to generate a voltage 714 across the capacitor C 710. A comparator 716 compares the voltage 714 across the capacitor C 710 with the input voltage VIN 630 at the eleventh terminal 632 to generate the off time TOFF_FIX 640 at a thirteenth (e.g., output) terminal 718. When the voltage 714 exceeds input voltage VIN 630, off time TOFF_FIX 640 is set high (e.g., to a logic one). Variable current sources 720 and 722 allow the rate of charging of the voltage 714 across the capacitor C 710 to be controlled as, for example, a design parameter. In the circuit 700, TOFF_FIX=(R*C*VIN)/VOUT, and the switching frequency of the timing controller 626 is substantially constant.

In FIG. 7, a first terminal 632 is coupled to an input voltage VIN 630 of a current-mode boost converter 506; a second terminal 634 is coupled to an output voltage VOUT 616 of the current-mode boost converter 506; a resistor R 704 has third and fourth terminals 751 and 752, the third terminal 751 is coupled to the second terminal 634; a capacitor C 710 having fifth and sixth terminals 753 and 754, the fifth terminal 753 is coupled to the second terminal 634, the sixth terminal 754 coupled to ground; a seventh terminal 708 is coupled to the control signal 650; a transistor MN1 706 having eighth and ninth terminals 755 and 756 is coupled, respectively, to the fifth and sixth terminals 753 and 754, and a gate 757 is coupled the seventh terminal 708; and a comparator 716 having tenth, eleventh and twelfth 758, 759 and 760, the tenth terminal 758 is coupled to the fifth terminal 753, the eleventh terminal 759 is coupled to the first terminal 632, and the twelfth terminal 760 is coupled to the terminal 718.

Figure 8:
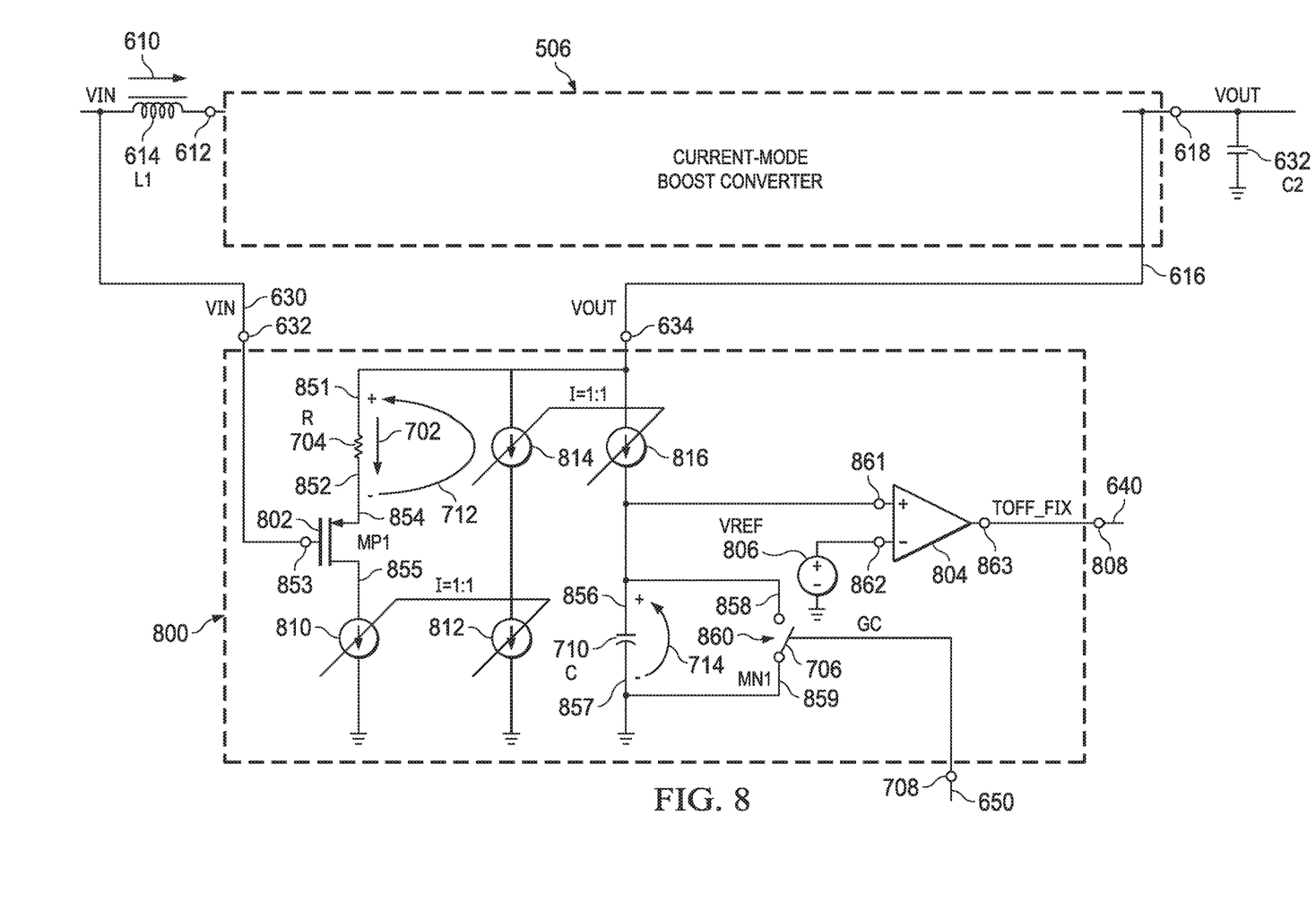
FIG. 8 is another example circuit that may be used to implement the timing generator of FIG. 6.

FIG. 8 is another example circuit 800 that may be used to implement the timing generator 636. In comparison to the circuit 700, in the circuit 800 the current 702 passing through the resistor R 704 is controlled by the input voltage VIN 630. In particular, in the circuit 800, when a MOSFET MP1 transistor 802 (e.g., a P-channel MOSFET) is turned on by the input voltage VIN 630 at the eleventh terminal 632, and the GC signal 650 at the fourteenth terminal 708 closes the gate of the MN1 transistor 706 (e.g., the GC signal 650 is a logic zero), the capacitor C 710 is charged by the voltage 712 generated by the current 702 passing through the resistor R 704 to generate the voltage 714 across the capacitor C 710. A comparator 804 compares the voltage 714 across the capacitor C 710 with a reference voltage VREF 806. When the voltage 714 exceeds reference voltage VREF 806, TOFF_FIX 640 is set high. The resulting off time TOFF_FIX 640 at a fifteenth (e.g., output) terminal 808 is substantially constant at (R*C*VREF)/(VOUT−VIN). Reference voltage VREF 806 is a constant reference voltage and may be generated from input voltage VIN 630 and/or output voltage VOUT 616. In some examples, VREF 806 is a design parameter like the values of R 704 and/or C 710. Variable current sources 810, 812, 813 and 814 allow the rate of charging of the voltage 714 across the capacitor C 710 to be controlled as, for example, a design parameter.

In FIG. 8, a first terminal 632 is coupled to an input voltage VIN 630 of a current-mode boost converter 506; a second terminal 634 is coupled to an output voltage VOUT 616 of the current-mode boost converter 506; a resistor R 704 has third and fourth terminals 851 and 852, the third terminal 851 is coupled to the second terminal 634; a transistor MP1 802 having a gate 853 and fifth and sixth terminals 854 and 855, the gate 853 is coupled to the first terminal 632, the fifth terminal 854 is coupled to the fourth terminal 852, the sixth terminal 855 is coupled to ground; a capacitor C 710 having seventh and eighth terminals 856 and 857, the seventh terminal 856 is coupled to the second terminal 634, the eighth terminal 857 is coupled to ground; a ninth terminal 708 is coupled to a control signal 650; a transistor MN1 706 having tenth and eleventh terminals 858 and 859 coupled, respectively, to the seventh and eighth terminals 856 and 857, and a gate 860 is coupled the ninth terminal 708; and a comparator 804 having twelfth, thirteenth and fourteenth terminals 861, 862 and 863, the twelfth terminal 861 is coupled to the second terminal 634, the thirteenth terminal 862 is coupled to the reference voltage 806, and the fourteenth terminal 863 is coupled to the terminal 808.

In the examples of FIGS. 7 and 8, there is a ripple IRIPPLE 1002 (FIG. 10) in the current 610 passing through the inductor L1 614 of IRIPPLE=(VOUT−VIN)*TOFF/L. If TOFF is set to (R*C*VREF)/(VOUT−VIN), then IRIPPLE=(R*C*VREF)/L. The ripple IRIPPLE 1002 is the peak-to-peak value of the inductor current 610. The ripple current IRIPPLE 1002 is substantially constant for a given input voltage VIN 630 and output voltage VOUT 616. Under such conditions, the transition between a conventional hysteretic mode and off time control mode according to aspects of this disclosure is smooth. Voltage reference VREF is the voltage 806, and L is the value of the inductor L1 614.

While example manners of implementing the example timing controller 626 of FIG. 6 according to aspects of this disclosure are illustrated in FIGS. 7 and 8, one or more of the analog circuit(s), digital circuit(s), logic circuit(s), elements, processes and/or devices illustrated in FIG. 7 and/or FIG. 8 may be combined, divided, re-arranged, omitted, eliminated and/or implemented in any other way. Further, the example circuit 700 of FIG. 7 and/or the example circuit 800 of FIG. 8 may include one or more analog circuit(s), digital circuit(s), logic circuit(s), elements, processes and/or devices in addition to, or instead of, those illustrated in FIG. 7 and/or FIG. 8, and/or may include more than one of any or all of the illustrated analog circuit(s), digital circuit(s), logic circuit(s), elements, processes and devices.

Figure 9:
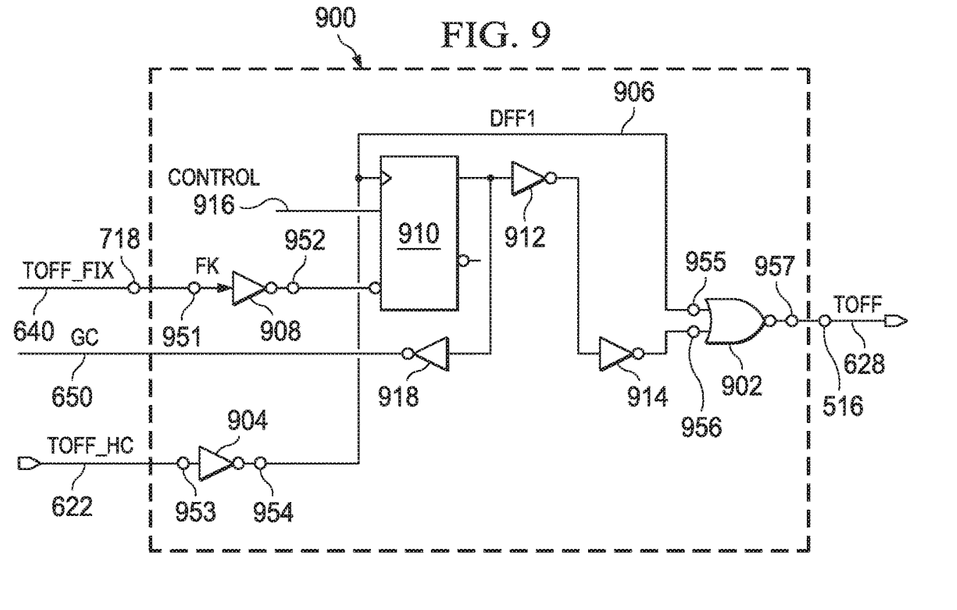
FIG. 9 is an example circuit that may be used to implement the selector of FIG. 6.

FIG. 9 is an example circuit 900 that may be used to implement the selector 638 of FIG. 6. The circuit 900 chooses the longer of the off time between the off time TOFF_FIX 640 generated by the off time generator 636 and the off time TOFF_HC 622 determined by the hysteretic current comparator 642. To select between the off time TOFF_FIX 640 and the off time TOFF_HC 622, the circuit 900 includes an exclusive OR (XOR) logic gate 902 that selects between the off time TOFF_FIX 640 and the off time TOFF_HC 622 based on the duration(s) of their respective off times. In the circuit 900, off time TOFF_HC 622 passes through an inverter 904 to generate a signal DFF1 906. Off time TOFF_FIX 640 is inverted by an inverter 908 and, in the example of FIG. 9 passes through a multiplexer 910 and two additional inverters 912 and 914. A control signal 916 and the multiplexer 910 allow the output off time TOFF 628 to always be off time TOFF_HC 622 or off time TOFF_FIX 640 by controlling both inputs of XOR 902 to be identical. The GC signal 650 is generated by inverting the inverted off time TOFF_FIX 640 with an inverter 918.

When an external Schottky diode is present, the off time TOFF_HC 614 generated by the hysteretic current comparator 642 is short, so the output off time TOFF 628 of the XOR 902 is the off time TOFF_FIX 640 of the timing generator 636. Thus, the off time TOFF 628 is extended, stabilizing the converter 500 in the presence of the external diode. When an external Schottky diode is not present, the off time TOFF_HC 622 generated by the hysteretic current comparator 642 is longer, and the selector 638 selects the off time TOFF_HC 622. Thus, the timing controller 626 can adapt between the presence or absence of an external diode, without having to be configured with such information.

In FIG. 9, a first inverter 908 having first and second terminals 951 and 952, the first terminal 951 is coupled to a third terminal 718, the second terminal 952 is coupled to a fourth terminal 516; a second inverter 904 having fifth and sixth terminals 953 and 954, the fifth terminal 953 is coupled to an off time signal TOFF_HC 622 of the current-mode boost converter 506; and an exclusive OR logic element 902 having seventh, eighth and ninth terminals 955, 956 and 957, the seventh terminal 955 is coupled to the sixth terminal 954, the eighth terminal 956 is coupled to the second terminal 952, the ninth terminal 957 is coupled to the fourth terminal 516.

In operation, the selector 638, 900 and the timing generator 636, 700, 800, when off time TOFF_HC 622 is low (e.g., a logic zero), set the signal DFF1 910 to high (e.g., set to a logic one), and set off time TOFF 628 to low (e.g., a logic zero). When the GC signal 650 is set high the transistor MN1 704 is turned on. While the transistor MN1 706 is turned on, the capacitor C 710 charges, and a timer is started. The duration of the timer is controlled by the values of the resistor R 704 and the capacitor C 710. DFF1 910 remains high until the voltage 714 across the capacitor C 710 is higher than input voltage VIN 630 or reference voltage VREF 806, and off time TOFF_FIX 640 to set high. When the voltage 714 across the capacitor C 710 is higher than input voltage VIN 630 or reference voltage VREF 806, DFF1 910 is set to low. When DFF1 904 is set to low, off time TOFF 628 is set to low for at least a minimum off time, and GC signal 650 is reset which turns off the transistor MN1 706. When TOFF_HC signal 622 is again set to low, the signal DFF1 904 rises. If off time TOFF_FIX 640 is still low, then off time TOFF 628 remains low. Thus, the longer of off time TOFF_HC 622 and off time TOFF_FIX 640 is selected.

While the circuit 900 may be used to implement the selector 625, one or more of the analog circuit(s), digital circuit(s), logic circuit(s), elements, processes and/or devices illustrated in FIG. 9 may be combined, divided, re-arranged, omitted, eliminated and/or implemented in any other way. Further still, the example 900 may include one or more analog circuit(s), digital circuit(s), logic circuit(s), elements, processes and/or devices in addition to, or instead of, those illustrated in FIG. 9, and/or may include more than one of any or all of the illustrated analog circuit(s), digital circuit(s), logic circuit(s), elements, processes and devices.

Figure 10:
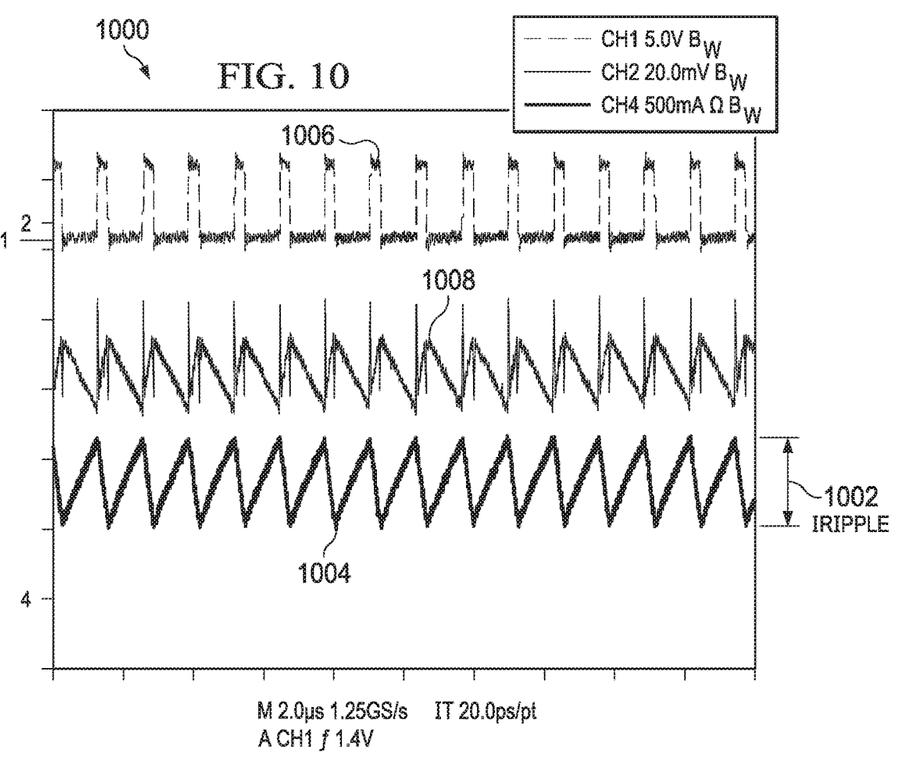
FIG. 10 is an example graph depicting example waveforms for the example converters disclosed herein configured with an external Schottky diode.

FIG. 10 is an example graph 1000 depicting example waveforms for the converter 600 with the circuit 800 configured with an external Schottky diode. The example graph 1000 includes an example waveform 1006 of the input voltage VIN 630 (FIG. 6), an example waveform 1008 of the output voltage VOUT 616, and an example waveform 1004 of the inductor current 610. As shown in FIG. 10, the waveform 1004, the waveform 1006 and the waveform 1008 are stable (e.g., having a waveform with a generally consistent amplitude, frequency, duty cycle, mean, etc.). The example IRIPPLE 1002 is the ripple of the current 610 passing through the inductor L1 614, it is the peak-to-peak value of the example waveform 1004.

Figure 11:
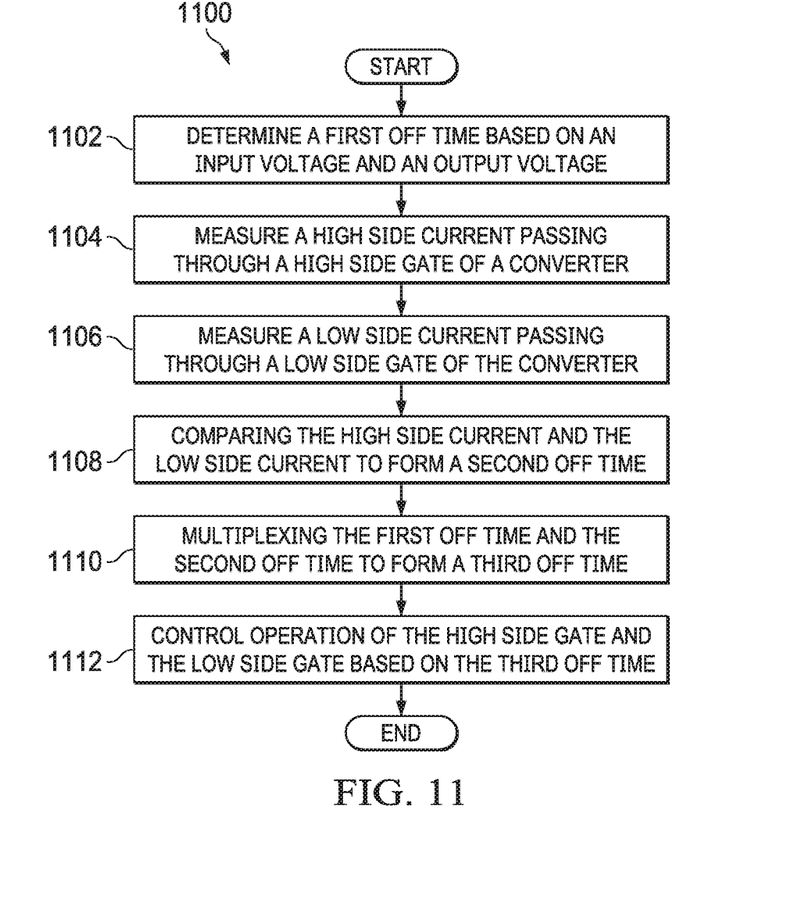
FIG. 11 is an example flowchart representative of example logic, hardware logic, hardware implemented state machines, etc., and/or any combination thereof for implementing the example converters disclosed herein.

FIG. 11 is an example flowchart 1100 representative of example logic, hardware logic, hardware implemented state machines, etc., and/or any combination thereof for implementing all or parts of the examples of FIGS. 5-9. Many other methods of implementing the examples of FIGS. 5-9 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

"Including" and "comprising" (and all forms and tenses thereof) are used herein to be open ended terms. Thus, whenever a claim employs any generate of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a generate such as A, B, and/or C refers to any combination or subset of A, B, C such as (1) A alone, (2) B alone, (3) C alone, (4) A with B, (5) A with C, (6) B with C, and (7) A with B and with C.

The example flowchart 1100 of FIG. 11 begins at block 1102. A first off time is determined based on an input voltage and an output voltage (block 1102). For example, the example off time generator 636 determines the first off time TOFF_FIX 640 based on output voltage VOUT 616 and input voltage VIN 630 using, for example, the example circuit 700, the example circuit 800, etc. A high side current passing through a high side transistor (e.g., the HSD driver 621) is measured (block 1104), and a low side current passing through a low side transistor (e.g., the LSD driver 620) is measured (block 1106). For example, an example high side sensor 652 measures the high side current, and an example low side sensor 654 measures the low side current.

The low side current and the high side current are compared to generate a second off time (block 1108). For example, the hysteretic current comparator 642 compares the low side current and the high side current to generate a second off time TOFF_HC 622. The first off time TOFF_FIX 640 and the second off time TOFF_HC 622 are used to generate a third off time (block 1110). For example, the selector 638 compares a first time duration of the first off time TOFF_FIX 640 and a second time duration of the second off time TOFF_HC 622 to generate the third off time TOFF 628. The third off time TOFF 628 is used to control the high side driver 621 and the low side driver 620 (block 1112). For example, PWM controller 644 and gate drivers 648 and 646 control the low side driver 620 and the high side driver 621, respectively, based on the third off time TOFF 628.

Figure 12:
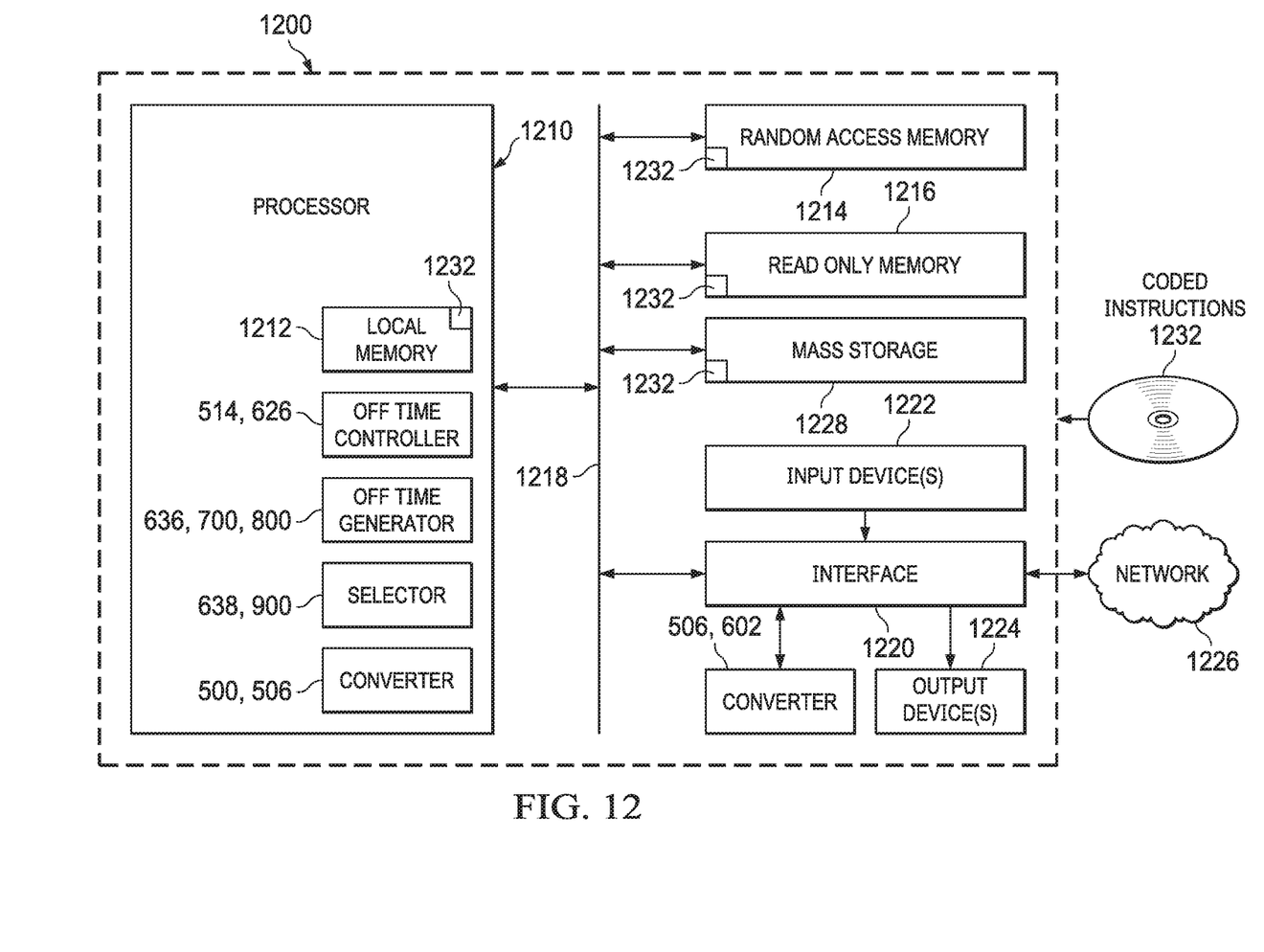
FIG. 12 illustrates an example processor platform structured to execute the example machine-readable instructions and/or the hardware logic of FIG. 11 to implement the example converters disclosed herein.

FIG. 12 is a block diagram of an example processor platform 1200 structured to execute the instructions of FIG. 11 to implement any of the examples of FIGS. 5-9. The processor platform 1200 can be, for example, a server, a personal computer, a workstation, a self-learning machine (e.g., a neural network), a mobile device (e.g., a cell phone, a smart phone, a tablet such as an IPAD™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1210. The processor 1210 of the illustrated example is hardware. For example, the processor 1210 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements all or part of the timing controllers, the off time generators, and the selectors of FIGS. 5-9.

The processor 1210 of the illustrated example includes a local memory 1212 (e.g., a cache). The processor 1210 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. In this example, the interface circuit 1220 enables the processor 1210 to communicate with, interface with and/or control the current-mode boost converters 506, 602. In some examples, the current-mode boost converters 506, 602 are analog circuits implemented within the processor 1210 or external to the processor 1210.

The input device(s) 1222 permit(s) a user to enter data and/or commands into the processor 1210. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc. In some examples of a Wi-Fi system, the interface circuit 1220 includes a radio frequency (RF) module, antenna(s), amplifiers, filters, modulators, etc.

The processor platform 1200 of the illustrated example also includes one or more mass storage devices 1228 for storing software and/or data. Examples of such mass storage devices 1228 include floppy disk drives, hard drive disks, CD drives, Blu-ray disk drives, redundant array of independent disks (RAID) systems, and DVD drives.

Coded instructions 1232 including the coded instructions of FIG. 11 may be stored in the mass storage device 1228, in the volatile memory 1214, in the non-volatile memory 1216, and/or on a removable non-transitory computer-readable storage medium such as a CD-ROM or a DVD.

From the foregoing, it will be appreciated that example methods, apparatus and circuits to control off times for hysteretic current-mode converters. From the foregoing, it will be appreciated that methods, apparatus and circuits have been disclosed that enhance the operations of, for example, hysteretic current-mode converters in applications in which conventional converters do not operate correctly, or do not operate satisfactorily. For example, when current sense of a MOSFET is unavailable. When an external Schottky diode is used for low-cost applications, small output loading, heavy output loaded (e.g., when an external Schottky diode is used), etc. Such examples obtain the benefits of hysteretic current-mode and constant off time mode with Schottky diode application. Disclosed examples have improved performance compared to conventional converters: no slope compensation, smaller die size, lower cost, smaller, smaller ripple, higher efficiency, stability when external Schottky diodes are used, work correctly or light and medium loads, VIN and VOUT can be close, when the converter working in hysteretic mode, the inductor ripple current is setting by internal parameter, the inductor ripple current is decided by constant off time generator when the converter working at constant off time mode.

Example methods, apparatus, and circuits to control timings for hysteretic current-mode converters are disclosed herein. Further examples and combinations thereof include at least the following.

Example 1 is a device to control timing of a current-mode boost converter that includes: device to control timing of a current-mode boost converter, the device comprising:
a first input terminal to receive an input voltage of the current-mode boost converter;
a second input terminal to receive an output voltage of the current-mode boost converter;
a generator to generate a first timing signal from the input voltage and the output voltage;
a third input terminal to receive a second timing signal from the current-mode boost converter;
a selector to select between the first on_off time signal and the second on_off time signal to generate a third on_off time signal based on a comparison of a first off time duration of the first on_off time signal and a second off time duration of the second on_off time signal; and
an output terminal to control off times of the current-mode boost converter based on the third on_off time signal.

Example 2 is the example device to control timing of a current-mode boost converter of example 1, wherein the selector is to select the first on_off time signal as the third on_off time signal when the first off time duration is longer than the second off time duration.

Example 3 is the example device to control timing of a current-mode boost converter of example 1, wherein the generator includes:
a resistor;
a transistor coupled to the resistor, the transistor to pass current through the resistor when the transistor is turned on responsive to the input voltage;
a capacitor charged by the current to generate a voltage across the capacitor; and
a comparator to compare the voltage with a reference voltage to generate the first on_off time signal.

Example 4 is the example device to control timing of a current-mode boost converter of example 1, wherein the generator includes:

a resistor, a current to pass through the resistor responsive to a gate control signal generated by the selector, an amount of the current based on the output voltage;

a transistor;

a capacitor charged by the current to generate a voltage across the capacitor when a gate of the transistor is closed; and a comparator to compare the voltage with the input voltage to generate the first on_off time signal.

Example 5 is the example device to control timing of a current-mode boost converter of example 1, wherein the selector includes:

an inverter to invert the second on_off time signal to generate a first control signal; and a gate of a transistor to, when the first control signal is high, set a second control signal to high to initiate charging of a capacitor of the generator.

Example 6 is a current-mode boost converter apparatus including:

a current-mode boost converter;

a generator to generate a first off time signal from an input voltage of the current-mode boost converter and an output voltage of the current-mode boost converter; and a selector to select between the first off time signal and a second off time signal of the current-mode boost converter to generate a third off time signal, a driver of the current-mode boost converter to operate responsive to the third off time signal.

Example 7 is the current-mode boost converter apparatus of example 6, wherein the selector is to select the first off time signal when a first off time duration of the first off time signal is longer than a second off time duration of the second off time signal.

Example 8 is the current-mode boost converter apparatus of example 6, wherein the generator is to generate a voltage across a capacitor when the input voltage turns on a transistor, and compare the voltage with a reference voltage to generate the first off time signal.

Example 9 is the current-mode boost converter apparatus of example 6, wherein the generator is to generate a voltage across a capacitor responsive to a control signal of the selector, and compare the voltage with the input voltage to generate the first off time signal.

Example 10 is the current-mode boost converter apparatus of example 6, wherein the current-mode boost converter is to turn on a low side drive FET and is to turn off a high side drive FET when the third off time signal is low, and is to turn off the low side drive FET and is to turn on the high side drive FET when the first off time signal is high.

Example 11 is a method including:

determining a first off time signal from an input voltage of a current-mode boost converter and an output voltage of the current-mode boost converter;

selecting between the first off time signal and a second off time signal of the current-mode boost converter to generate a third off time signal; and controlling operation of the current-mode boost converter based on the third off time signal.

Example 12 is the method of example 11, further including:

measuring a high side current passing through a high side driver of the current-mode boost converter;

measuring a low side current passing through a low side driver of the current-mode boost converter; and comparing the low side current and the high side current to generate the second off time signal.

Example 13 is the method of example 11, further including:

turning on a low side drive FET and turning off a high side drive FET when the third off time signal is low; and turning off the low side drive FET and turning on the high side drive FET when the first off time signal is high.

Example 14 is the method of example 11, further including:

determining a first off time duration of the first off time signal;

determining a second off time duration of the second off time signal; and selecting the first off time signal as the third off time signal when the first off time duration is longer than the second off time duration.

Example 15 is the method of example 11, further including:

generating a voltage across a capacitor when the input voltage turns on a transistor; and comparing the voltage with a reference voltage to generate the first off time signal.

Example 16 is a device including:

a first terminal coupled to an input voltage of a current-mode boost converter;

a second terminal coupled to an output voltage of the current-mode boost converter;

a resistor having third and fourth terminals, the third terminal coupled to the second terminal;

a transistor having a gate and fifth and sixth terminals, the gate coupled to the first terminal, the fifth terminal coupled to the fourth terminal, the sixth terminal coupled to a ground;

a capacitor having seventh and eighth terminals, the seventh terminal coupled to the second terminal, the eighth terminal coupled to the ground;

a ninth terminal coupled to a control signal;

a transistor having tenth and eleventh terminals coupled, respectively, to the seventh and eighth terminals, and a gate coupled the ninth terminal; and a comparator having twelfth, thirteenth and fourteenth terminals, the twelfth terminal coupled to the second terminal, the thirteenth terminal coupled to a reference voltage.

Example 17 is the device of example 16, further including:

a first inverter having fifteenth and sixteenth terminals, the fifteenth terminal coupled to the fourteenth terminal;

a second inverter having seventeenth and eighteenth terminals, the seventeenth terminal coupled to an off time signal of the current-mode boost converter; and an exclusive OR logic element having nineteenth, twentieth and twenty-first terminals, the nineteenth terminal coupled to the sixteenth terminal, the twentieth terminal coupled to the eighteenth terminal, the twenty-first terminal coupled to an off time input of the current-mode boost converter.

Example 18 is the device of example 17, wherein the sixteenth terminal coupled to the nineteenth terminal via one or more logic devices.

Example 19 is the device of example 17, further including a fourth inverter having twenty-second and twenty-third terminals, the twenty-second terminal coupled to the sixteenth terminal, and the twenty-third terminal coupled to the ninth terminal.

Example 20 is the device of example 17, further including:

a PWM controller of the current-mode boost converter having twenty-second and twenty-third terminals, the twenty-second terminal coupled to the twenty-first terminal, the twenty-third terminal coupled to a gate driver; and a hysteretic current comparator having a twenty-fourth terminal coupled to the seventeenth terminal.

It is noted that this patent claims priority from U.S. Provisional Patent Application Ser. No. 62/621,148, which was filed on Jan. 24, 2018, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device to control timing of a current-mode boost converter, the device comprising:
   a first input terminal to receive an input voltage of the current-mode boost converter;
   a second input terminal to receive an output voltage of the current-mode boost converter;
   a generator to generate a first timing signal from the input voltage and the output voltage, the generator including a transistor having a control terminal, a first current terminal and a second current terminal and the generator further including a capacitor connected between the first current terminal and the second current terminal of the transistor;
   a third input terminal to receive a second timing signal from the current-mode boost converter;
   a selector to select between the first timing signal and the second timing signal to generate a third timing signal based on a comparison of a first off time duration of the first timing signal and a second off time duration of the second timing signal, the selector including an inverter having an input connected to the second timing signal and the selector operable to output a first control signal;
   an output terminal to control off times of the current-mode boost converter based on the third timing signal; and
   wherein the control terminal is coupled to the first control signal and the transistor is operable to charge the capacitor in response to the first control signal.

2. The device of claim 1, wherein the selector is to select the first timing signal as the third timing signal when the first off time duration is longer than the second off time duration.

3. The device of claim 1, wherein the generator includes:
   a resistor coupled to the transistor; and
   a comparator to compare a voltage across the resistor with a reference voltage to generate the first timing signal.

4. A device comprising:
   a first terminal coupled to an input voltage of a current-mode boost converter;
   a second terminal coupled to an output voltage of the current-mode boost converter;
   a resistor having third and fourth terminals, the third terminal coupled to the second terminal;
   a transistor having a gate and fifth and sixth terminals, the gate coupled to the first terminal, the fifth terminal coupled to the fourth terminal, the sixth terminal coupled to a ground;
   a capacitor having seventh and eighth terminals, the seventh terminal coupled to the second terminal, the eighth terminal coupled to the ground;
   a ninth terminal coupled to a control signal;
   a transistor having tenth and eleventh terminals coupled, respectively, to the seventh and eighth terminals, and a gate coupled the ninth terminal;
   a comparator having twelfth, thirteenth and fourteenth terminals, the twelfth terminal coupled to the second terminal, the thirteenth terminal coupled to a reference voltage;
   a first inverter having fifteenth and sixteenth terminals, the fifteenth terminal coupled to the fourteenth terminal;
   a second inverter having seventeenth and eighteenth terminals, the seventeenth terminal coupled to an off time signal of the current-mode boost converter; and
   an exclusive OR logic element having nineteenth, twentieth and twenty-first terminals, the nineteenth terminal coupled to the sixteenth terminal, the twentieth terminal coupled to the eighteenth terminal, the twenty-first terminal coupled to an off time input of the current-mode boost converter.

5. The device of claim 4, the sixteenth terminal coupled to the nineteenth terminal via one or more logic devices.

6. The device of claim 4, further including a fourth inverter having twenty-second and twenty-third terminals, the twenty-second terminal coupled to the sixteenth terminal, and the twenty-third terminal coupled to the ninth terminal.

7. The device of claim 4, further including:
   a PWM controller of the current-mode boost converter having twenty-second and twenty-third terminals, the twenty-second terminal coupled to the twenty-first terminal, the twenty-third terminal coupled to a gate driver; and
   a hysteretic current comparator having a twenty-fourth terminal coupled to the seventeenth terminal.

8. A controller for controlling the on-time and off-time of a power switch included in a current-mode boost converter, the controller comprising:
   a generator having a first generator input, a second generator input, a third generator input and a generator output, the first generator input operable to be connected to a converter input voltage of the current-mode boost converter, the second generator input operable to be coupled to a converter output voltage of the current-mode boost converter and the generator output operable to provide a first timing signal having a first off-time in response to the converter input voltage and the converter output voltage;
   a selector having a first selector input, a second selector input, a first selector output and a second selector output, the first selector input connected to the first timing signal, the second selector input connected to a second timing signal having a second off-time, the first selector output is operable to be coupled to a control terminal of the power switch and the second selector output connected to the third generator input; and
   wherein the second off-time is based on a reference voltage, the converter output voltage and a current through the power switch.

9. The controller of claim 8, wherein the selector is operable to output a third timing signal at the first selector output.

10. The controller of claim 9, wherein the first selector output provides the first timing signal if the first off-time is longer than the second-off time.

11. The controller of claim 9, wherein the first selector output provides the second timing signal if the second off-time is longer than the first off-time.

* * * * *